United States Patent Office 2,762,780
Patented Sept. 11, 1956

2,762,780

ANTIFOAM COMPOSITIONS

Sheldon E. Kulakow, now by change of name Sheldon E. Kent, Chicago, Ill., assignor, by mesne assignments, to Hodag Chemical Corporation, Chicago, Ill., a corporation of Illinois No Drawing. Application May 7, 1952,
Serial No. 286,616

26 Claims. (Cl. 252—321)

My invention relates to defoaming or antifoaming compositions and is particularly concerned with new and useful improvements therein.

The foaming of liquids is a frequent cause of difficulties in industrial and laboratory procedures and various methods have, in the past, been evolved for preventing or reducing foaming. Typical among industrial processes where it has been found highly important to use foam preventive measures are various types of fermentations, for example, yeast fermentations and fermentation procedures for the production of various antibiotic agents, purification of beet juices, manufacture of glue, separation of cream, production of steam in boilers, separation of paper and coated papers, the heat dehydration of crude oils and tars, purification of sewage, and the boiling, vacuum evaporation, distillation and filtering of various types of solutions.

In general, these methods fall into two groups which may be classified roughly as mechanical and chemical. In mechanical procedures for reducing foaming, it is common to employ pulsating streams of gas above the liquid, perforated spiral canals, centrifugal operations, continuous pumping of liquid from the bottom to the top of the container, changes in pressure, and allied methods, all of which, while being somewhat effective, leave much to be desired. The chemical methods have involved, generally speaking, the addition of small amounts of various chemical defoaming agents to the liquids. Typical of such defoaming agents are, for example, caprylic alcohol, amyl alcohol, octyl alcohol, linseed oil, castor oil, rapeseed oil, lard oil, mineral oil, milk, tri-methylcyclohexanol, phenyl ether, isoamyl isovalerate, synthetic surface active agents, and the like. Many of these materials are reasonably effective so far as their foam reducing properties per se are concerned. However, they are frequently required to be used in such large amounts that it is difficult to get effective control, the cost is high, and there is a marked danger of contamination of the end product of treatment of the liquid and, in the case of various fermentations, adverse toxic effects with respect thereto. Certain bottoms products resulting from the solvent extraction of low grade animal fats and vegetable oils have also heretofore been suggested for use as defoamers but they have a number of serious objections, particularly in relation to their physical properties and their tendency is to clog pumps and automatic foam control systems. Synthetic surface active agents have, in general, been shown to be more effective as defoamers than such products as linseed oil, castor oil, and various other agents which were originally suggested and utilized for defoaming purposes but even such synthetic surface active agents suffer a number of disadvantages with which those skilled in the art are thoroughly familiar.

In accordance with my invention, new and highly advantageous antifoam compositions have been evolved which overcome numerous of the objections which have heretofore characterized prior agents and compositions which have been used in this field. In general, my compositions contain, as essential ingredients, sugar cane oil and an oil-soluble emulsifier, particularly an oil-soluble normally liquid non-ionic emulsifier. In the especially preferred compositions of my invention, there is also included an oil-miscible fluidizing carrier, all as is described in detail hereafter.

Antifoam compositions made in accordance with my invention have been found to be highly effective over a very wide range of foaming conditions and in diverse types of environments. Thus, for example, they have been found to be highly effective, among other uses, in fermentation operations of the type described above, in drying operations, in oil well production procedures, and the like. The particularly preferred antifoam compositions of my invention have been found to be readily compatible with the solutions or the like in which they are used as, for example, in the case of fermentation procedures wherein my antifoam agents are non-toxic to the organisms and do not contaminate the system. They serve effectively to control foaming with amounts much smaller, generally speaking, than was heretofore required with various products at present in general use. In some instances, for example, it has been found that my antifoaming compositions can be used in amounts from 30 to 40% less than has been required in the case of foaming agents which my compositions have effectively replaced. The anti-foam compositions made in accordance with my invention are, in their particularly preferred embodiments, thin, free-flowing homogeneous liquids which do not settle out or stratify and which are resistant to heating and also to storage at low temperatures over prolonged periods of time. They react very quickly in the environments in which they are used and their antifoaming properties remain effective over a long period of time thus resulting in lower quantities required and, concomitantly, lower costs. They are highly flexible in the manner in which they can be used so that they may be employed in conjunction with any system as, for example, drip-bucket, automatic spray, or cooking with the particular media involved. Because they are readily emulsifiable with water, they enable the equipment in which they have been used easily to be cleaned. Their properties are uniform and they can be controlled readily so as to permit adjustments in order to obtain optimum results in any individual situation or environment which may be involved. In certain types of fermentations, moreover, such as yeast fermentations and fermentations utilized in the production of antibiotic agents, various of the antifoam agents of my invention serve the additional purpose of stimulating the growth of the organisms. Finally, the ingredients utilized in my antifoam agents are readily available and are low in cost thus making for particularly economical operations.

The sugar cane oil, which comprises one of the essential ingredients of my antifoam compositions, is a by-product of the manufacture of sugar cane wax. It is a semi-solid under normal temperatures. By itself, it possesses slight defoaming characteristics but it is unsatisfactory. I have found, however, that if there is admixed therewith an oil-soluble emulsifier or mixtures of such emulsifiers, especially emulsifiers which are normally liquid and are of the non-ionic type, a coaction takes place which results in unusual enhancement of the antifoaming properties of the sugar cane oil with the result that, among other things, the defoaming or antifoaming action takes place much more rapidly. I have also found that it is particularly advantageous to incorporate into the mixture of the sugar cane oil and the oil-soluble emulsifier an oil-miscible fluidizing carrier. This carrier may comprise, for example, a triglyceride oil such as crude or refined soya bean oil, corn oil, cottonseed oil, peanut oil, olive oil, lard oil, or various other animal or vegetable oils. Fatty alcohols may also be used as carriers in some cases and the same is true of ordinary hydrocarbon solvents although the latter are not preferred. I have found that the most effective carriers, for my purposes, are free-flowing mineral oils, particularly mineral oils of the paraffin type, a typical example of which is U. S. P. grade White Oil.

The oil-soluble emulsifier or mixtures of emulsifiers can be selected from a wide number of products available on the market and sold under a variety of trade names or trademarks. While such emulsifiers can be selected from any of the groups of anionic, cationic, and non-ionic classes, I have found, as stated above, that the use of the non-ionic emulsifiers represents a particularly preferred and important embodiment of my invention. Among the emulsifiers which can be used are, for example, the oil-soluble higher molecular weight fatty acid partial ethers and esters of polyhydroxy substances, particularly aliphatic polyhydric alcohols as, for instance, such esters of glycerol, glycols and polyglycols, polyglycerols, sugar alcohols, pentaerythritol, and the like. Specific examples includes the oleic acid mono- and di-esters of glycerol and mixtures of said esters; the oleic acid mono-ester of polyoxyethylene glycol (400); oleic acid mono-ester of polyoxyethylene glycols containing from 6 to 20 oxyethylene groups; sorbitan trioleate; polyoxyethylene sorbitan mono-oleate in which the number of polyoxyethylene groups is between 4 and 8; tall oil fatty acid mono- and di-esters of polyoxyethylene glycol containing from 4 to 8 polyoxyethylene groups; mahogany sulfonates; alkylated benzene sulfonates, in the form of their alkali metal or amine salts as, for example, triethanolamine salts, the alkyl group or groups containing upwards of 20 or 22 carbon atoms; and the like. In the designations of products such as the oleic acid mono-ester of polyoxyethylene glycol, the reference to numbers such as (300), (400), (600), etc. indicates the average molecular weight of the polyoxyethylene glycol portion of the molecule. Thus, for example, polyethylene glycol (400) mono-oleate contains an average of about nine oxyethylene groups.

The proportions of the ingredients comprising my antifoam compositions are variable within relatively wide limits. The sugar cane oil may, for example, range from about 5% to 80%, by weight, of the composition, particularly satisfactory results being obtained with compositions containing from about 40 to about 60%, by weight, of cane oil. The oil-soluble emulsifier or mixtures of compatible such emulsifiers may range, in general, from about 3% to about 15%, and more advantageously from about 5% to about 10%, by weight, of the antifoam compositions and, in the particularly preferred embodiments of my invention, such oil-soluble emulsifier or emulsifiers range from about 5% to about 20%, based on the weight of the sugar cane oil. The oil-miscible fluidizing carrier can range from about slightly over 5% to approximately 90% with particularly preferred compositions containing from about 30% to 55% of the carrier. In terms of parts by weight, satisfactory compositions made in accordance with my invention will, in the usual case, contain from about 20 to 60 parts of sugar cane oil, from about 3 to about 15 parts of oil-soluble emulsifier, and from about 30 to about 100 parts of the oil-miscible fluidizing carrier. It will be understood, of course, that supplemental ingredients may be utilized which do not adversely affect the functioning of the above described anti-foam compositions of my invention.

The following examples are illustrative of anti-foam compositions falling within the scope of my invention, it being understood that such examples are in nowise limitative of the scope of my invention. All parts are by weight.

Example 1

| | |
|---|---|
| Sugar cane oil | 45 |
| Polyethyleneglycol (400) mono-oleate | 10 |
| Paraffin-type mineral oil | 45 |

Example 2

| | |
|---|---|
| Sugar cane oil | 60 |
| Polyethyleneglycol (200) mono-oleate | 10 |
| Paraffin-type mineral oil | 30 |

Example 3

| | |
|---|---|
| Sugar cane oil | 80 |
| Sorbitan trioleate | 12 |
| Crude soya bean oil | 8 |

Example 4

| | |
|---|---|
| Sugar cane oil | 5 |
| Oleic acid mixed mono- and di-glycerides | 5 |
| Cottonseed oil | 90 |

Example 5

| | |
|---|---|
| Sugar cane oil | 48 |
| Lard oil mixed fatty acid di-esters of diglycerol | 4 |
| Lard oil | 48 |

Example 6

| | |
|---|---|
| Sugar cane oil | 40 |
| Polyethyleneglycol (400) mono-oleate | 10 |
| Soya bean oil | 25 |
| Corn oil | 25 |

Example 7

| | |
|---|---|
| Sugar cane oil | 50 |
| Oleic acid mixed mono- and diglycerides | 8 |
| Soya bean oil | 42 |

Example 8

| | |
|---|---|
| Sugar cane oil | 50 |
| Oxazolaine derived from oleic acid and 2-amino-2-methyl-1,3-pentanediol ("Alkaterge O") | 10 |
| Soya bean oil | 40 |

Example 9

| | |
|---|---|
| Sugar cane oil | 40 |
| Alkylated benzene sulfonates (triethanolamine salts) wherein alkyl radical contains twenty-two to thirty carbon atoms | 5 |
| Cottonseed oil | 55 |

Example 10

| | |
|---|---|
| Sugar cane oil | 35 |
| Cottonseed oil fatty acid mono-esters of polyethyleneglycol (400) | 10 |
| Cottonseed oil | 55 |

Example 11

| | |
|---|---|
| Sugar cane oil | 50 |
| Polyethyleneglycol (400) mono-oleate | 8 |
| Mineral oil | 42 |

The proportions of antifoam compositions which are utilized to reduce or inhibit formation of foam are variable, depending upon the particular environment in which they are to be used and the exact nature of the results desired. In this connection, it will be understood, of course, that a particular composition will not function optimumly in different environments in which it is intended to be used. Some adjustments, therefore, may from time to time be required if the most advantageous use is to be made of the teachings of my present invention. Those skilled in the art will, however, in the light of the discussions made herein, readily be able to select suitable compositions and in the best proportions as may be dictated by the particular use to which such compositions are to be placed. In general, it may be observed that the proportions of the antifoaming compositions to be used in connection with the treatment of liquids to inhibit foaming thereof will vary from about 0.01% to about 0.5%, more or less.

What I claim as new and desire to protect by Letters Patent of the United States is:

1. An antifoam composition containing, as essential ingredients, sugar cane oil and an oil-soluble emulsifier, said emulsifier being present in proportions sufficient to enhance substantially the defoaming properties of said sugar cane oil.

2. An anifoam composition containing, as essential ingredients, sugar cane oil and an oil-soluble emulsifier, said emulsifier being present in proportions between about 5% and about 20%, based on the weight of the sugar cane oil.

3. An antifoam composition in accordance with claim 2, wherein the oil-soluble emulsifier is an oleic acid monoester of a polyoxyethylene glycol having from 6 to 20 oxyethylene groups.

4. An antifoam composition containing, as essential ingredients, sugar cane oil, an oil-soluble emulsifier, and an oil-miscible fluidizing carrier, said emulsifier being present in proportions sufficient to enhance substantially the defoaming properties of said sugar cane oil, and said carrier being present in proportions ranging from 5% to 90%, by weight, of said antifoam composition.

5. An antifoam composition containing, as essential ingredients, sugar cane oil, an oil-soluble emulsifier, and a paraffin-type mineral oil carrier, said emulsifier being present in proportions sufficient to enhance substantially the defoaming properties of said sugar cane oil, and said carrier being present in proportions ranging from 5% to 90%, by weight, of said antifoam composition.

6. An antifoam composition containing, as essential ingredients, sugar cane oil, an oil-soluble non-ionic emulsifier, and an oil-miscible fluidizing carrier, said emulsifier being present in proportions sufficient to enhance substantially the defoaming properties of said sugar can oil, and said carrier being present in proportions ranging from 5% to 90%, by weight, of said antifoam composition.

7. An antifoam composition containing, as essential ingredients, sugar cane oil, an oil-soluble non-ionic emulsifier, and a paraffin-type mineral oil carrier, said emulsifier being present in proportions sufficient to enhance substantially the defoaming properties of said sugar cane oil, and said carrier being present in proportions ranging from 5% to 90%, by weight, of said antifoam composition.

8. An antifoam composition containing, as essential ingredients, the following in substantially the stated proportions by weight:

Sugar cane oil _____ 20 to 60
Oil-soluble emulsifier _____ 3 to 15
Oil-miscible fluidizing carrier _____ 30 to 100

9. An antifoam composition containing, as essential ingredients, the following in substantially the stated proportions by weight:

Sugar cane oil _____ 20 to 60
Oil-soluble non-ionic emulsifier _____ 3 to 15
Oil-miscible fluidizing carrier _____ 30 to 100

10. An antifoam composition containing, as essential ingredients, the following in substantially the stated proportions by weight:

Sugar cane oil _____ 20 to 60
Oil-soluble non-ionic emulsifier _____ 3 to 15
Paraffin-type mineral oil carrier _____ 30 to 100

11. An antifoam composition containing, as essential ingredients, the following in substantially the stated percentages by weight:

Per cent
Sugar cane oil _____ 40 to 60
Oil-soluble emulsifier _____ 5 to 10
Oil-soluble fluidizing carrier _____ 30 to 55

12. An antifoam composition containing, as essential ingredients, the following in substantially the stated percentages by weight:

Per cent
Sugar cane oil _____ 40 to 60
Oil-soluble non-ionic emulsifier _____ 5 to 10
Oil-soluble fluidizing carrier _____ 30 to 55

13. An antifoam composition containing, as essential ingredients, the following in substantially the stated percentages by weight:

Per cent
Sugar cane oil _____ 40 to 60
Oil-soluble non-ionic emulsifier _____ 5 to 10
Paraffin-type mineral oil carrier _____ 30 to 55

14. An antifoam composition containing, as essential ingredients, the following in substantially the stated percentages by weight:

Per cent
Sugar cane oil _____ 40 to 60
Polyethyleneglycol mono-oleate _____ 5 to 10
Mineral oil carrier _____ 30 to 55

15. An antifoam composition containing, as essential ingredients, the following in substantially the stated percentages by weight:

Per cent
Sugar cane oil _____ 40 to 60
Polyethyleneglycol (400) mono-oleate _____ 5 to 10
Paraffin-type mineral oil carrier _____ 30 to 55

16. A process for abating or destroying the formation of foam in foamable materials, which process comprises, adding to such materials an agent comprising sugar cane oil and an emulsifier as essential ingredients, said emulsifier being present in proportions sufficient to enhance substantially the defoaming properties of said sugar cane oil, and a carrier for said essential ingredients.

17. A process for abating or destroying foam in foamable liquids which comprises adding to said foamable liquid sugar cane oil and an oil-soluble emulsifier in proportions sufficient to enhance substantially the defoaming properties of said sugar cane oil.

18. A process for abating or destroying foam in foamable liquids which comprises adding to said foamable liquid a defoaming agent, said agent comprising sugar cane oil, an oil-miscible fluidizing carrier, and an oil-soluble emulsifier in proportions sufficient to enhance substantially the defoaming properties of said sugar cane oil.

19. A process according to claim 18, wherein the fluidizing carrier comprises a mineral oil.

20. A process for abating or destroying foam in foamable liquids which comprises adding to said foamable liquid a defoaming agent containing the following in substantially the stated proportions by weight:

Sugar cane oil _____ 20 to 60
Oil-soluble emulsifier _____ 3 to 15
Oil-miscible liquid fluidizing carrier _____ 30 to 100

21. A process for abating or destroying foam in foamable liquids which comprises adding to said foamable liquid a defoaming agent containing the following in substantially the stated proportions by weight:

Sugar cane oil _____ 20 to 60
Oil-soluble non-ionic emulsifier _____ 3 to 15
Mineral oil carrier _____ 30 to 100

22. A process for abating or destroying foam in foamable liquids which comprises adding to said foamable liquid a defoaming agent containing the following in substantially the stated proportions by weight:

Sugar cane oil _____ 40 to 60
Polyethyleneglycol monooleate _____ 5 to 10
Mineral oil carrier _____ 30 to 55

23. A process for abating or destroying the formation of foam in foamable materials in a yeast fermentation process, said process comprising adding to such materials an agent comprising sugar cane oil and an oil-soluble emulsifier as essential ingredients, said emulsifier being present in proportions sufficient to enhance substantially the defoaming properties of said sugar cane oil.

24. A process for abating or destroying foam in foamable liquids in a yeast fermentation process, which comprises adding to said foamable yeast fermentation liquid a defoaming agent, said agent comprising sugar cane oil, a mineral oil fluidizing carrier, and an oil-soluble emulsifier in proportions sufficient to enhance substantially the defoaming properties of said sugar cane oil.

25. A process for abating or destroying foam in foamable yeast fermentation liquids which comprises adding to said foamable liquid a defoaming agent containing the following in substantially the stated proportions by weight:

| | |
|---|---|
| Sugar cane oil | 20 to 60 |
| Oil-soluble non-ionic emulsifier | 3 to 15 |
| Mineral oil carrier | 30 to 100 |

26. A process for abating or destroying foam in foamable yeast fermentation liquids which comprises adding to said foamable liquid a defoaming agent containing the following in substantially the stated proportions by weight:

| | |
|---|---|
| Sugar cane oil | 40 to 60 |
| Polyethyleneglycol monooleate | 5 to 10 |
| Mineral oil carrier | 30 to 55 |

References Cited in the file of this patent

UNITED STATES PATENTS

| | | |
|---|---|---|
| 2,230,556 | Zimmer et al. | Feb. 4, 1941 |
| 2,340,035 | Zimmer et al. | Jan. 25, 1944 |
| 2,346,928 | Lighthipe | Apr. 18, 1944 |
| 2,347,178 | Fritz et al. | Apr. 25, 1944 |
| 2,390,212 | Fritz | Dec. 4, 1945 |
| 2,550,450 | Brown et al. | Apr. 24, 1951 |
| 2,563,857 | McGinn | Aug. 14, 1951 |